INVENTOR
HAROLD FLEISHER

BY Sughrue, Rothwell, Mion & Zinn
ATTORNEYS

Jan. 12, 1965 H. FLEISHER 3,165,718

SPECIMEN IDENTIFICATION APPARATUS

Filed Dec. 4, 1961

4 Sheets-Sheet 3

Jan. 12, 1965 H. FLEISHER 3,165,718

SPECIMEN IDENTIFICATION APPARATUS

Filed Dec. 4, 1961

4 Sheets-Sheet 4

United States Patent Office 3,165,718

Patented Jan. 12, 1965

3,165,718

SPECIMEN IDENTIFICATION APPARATUS

Harold Fleisher, Poughkeepsie, N.Y., assignor to International Business Machines Corporation, New York, N.Y., a corporation of New York Filed Dec. 4, 1961, Ser. No. 156,843

3 Claims. (Cl. 340—146.3)

This invention relates generally to specimen identification apparatus and, more particularly, to an improved character recognition apparatus wherein a function of an unknown character is compared with similar functions of a plurality of reference characters in order to identify the unknown character.

The primary object of this invention is to provide specimen identification apparatus for counting selected groups of character segments in an unknown character and comparing the group sums with corresponding group sums of reference characters.

Another object is to provide such an apparatus wherein the number of groups may be varied, thereby expanding the character recognizing capability of the apparatus.

Briefly, in accordance with a broad feature of this invention, an unknown character is written, printed or otherwise displayed on a matrix. The rows and columns of the matrix are individually scanned to determine for each row and column the number of matrix segments which contain a portion or segment of the character. The individual row and column sums are then individually compared with corresponding sums of a plurality of reference characters to provide an output signal whenever the individual row and column counts of the unknown character coincide with the reference character sums, thereby providing an identification or recognition of the unknown character.

Other objects of the invention will be pointed out in the following description and claims and illustrated in the accompanying drawings which disclose, by way of example, the principle of the invention and the best mode which has been contemplated of applying that principle.

Figure 1:
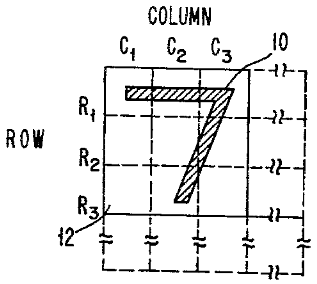
FIGURE 1 shows a typical character displayed on a typical matrix.

Now, with reference to the drawings, FIGURE 1 shows a typical specimen or character 10 in the form of the Arabic numeral "7" displayed on a three-by-three matrix 12. Even though FIGURES 1, 2 and 3 will be considered as dealing with such a three-by-three matrix, the break lines shown in these figures are intended to indicate that any other desired matrix, such as the eight-by-eight matrix shown in FIGURE 4, may be used; however, for the purpose of understanding this invention, the three-by-three matrix 12 will suffice. The columns of this matrix have been designated as C1, C2, C3, etc., and the rows as R1, R2, R3, etc. Any character or matrix segment may be identified by a coordinate system utilizing the column and row designations; for example, the center matrix segment may be identified as C2, R2.

Figure 2:
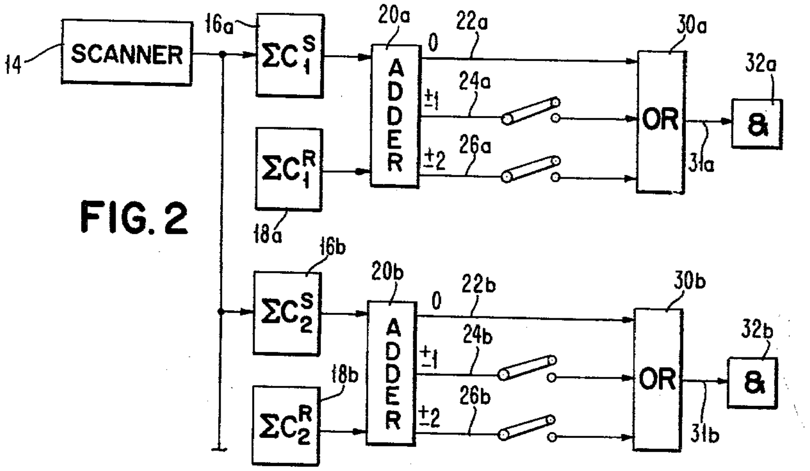
FIGURE 2 shows an arrangement for counting the unknown character segments and comparing them with reference characters.

Turning now to FIGURE 2, there is shown diagrammatically a conventional scanner 14, preferably of the optical type such as a flying spot scanner. Scanner 14 senses or scans individually each column and row in matrix 12 and provides an output pulse each time a portion of the character 10 appears in any matrix segment. The output pulses from scanner 14 are summed by means of a plurality of counters 16*a*, 16*b*, etc. The number of counters 16 is identical to the number of rows and columns which, in the case of a three-by-three matrix, would be six. The symbol $\Sigma C_1^S$ in block 16*a* indicates a counter 16 storing the C1 count of the specimen or unknown character.

There are also provided a plurality of registers 18*a*, *b* etc., each of which holds a row or column count of a reference character. For the case being considered, there would be six registers 18 for each reference character. Therefore, in a system limited to identifying the Arabic numerals, there would be six counters 16 and sixty registers 18. The symbol $\Sigma C_1^R$ in block 18*a* indicates a register 18*a* holding the C1 count of a reference or perfect character.

The counts of each pair of corresponding counters 16 and registers 18 are applied to one of a plurality of adders 20*a*, *b*, etc. For example, the outputs of counters 16*a* and registers 18*a* are applied to an adder 20*a*. Each of the adders 20 functions to perform a comparison of its two inputs. For instance, the C1 count of the unknown character 10 is added to the complement of the C1 count of each reference character. Consequently, looking at counters 16*a* and register 18*a*, for example, when their counts are equal then a perfect match is indicated by a "0" appearing on the adder output line 22*a*; i.e., line 22 is up. Output lines 24*a* and 26*a* may be disregarded for the present. The "0" output on line 22 is coupled through an OR circuit 30*a* to condition one leg of an AND circuit 32*a*. The five other sets of counters, adders, OR and AND circuits all operate in the same manner as just described.

Therefore, each row and column count of the unknown character 10 is compared with the corresponding row and column count of a reference character to condition an AND gate 32 when a match between the corresponding counts occurs. The comparison, of course, in the case of the Arabic numeral identification system is performed for each of ten reference characters and there will be only one set of AND gates 32 all of which will be conditioned by the unknown character.

Figure 3:
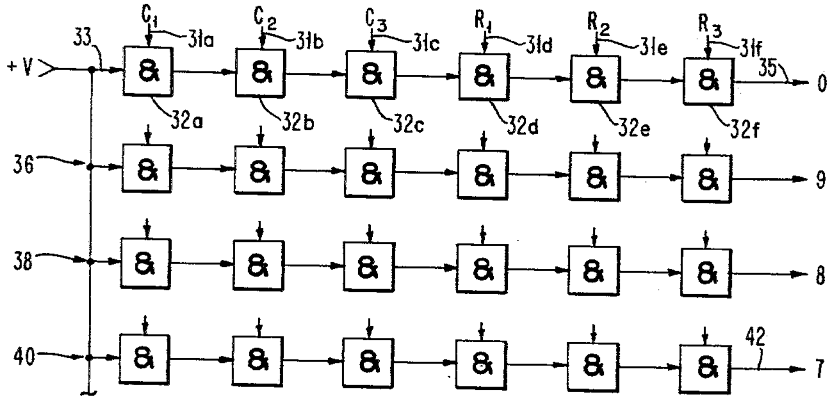
FIGURE 3 shows a logical circuit arrangement for recognizing the unknown character.

FIGURE 3 shows a logic circuit for identifying or recognizing the unknown character 10 by utilizing the outputs from OR gates 30. Let us consider the top row of AND gates shown in FIGURE 3 as the AND gates 32 shown in FIGURE 2. As explained previously in connection with FIGURE 2, a positive output from each OR gate 30 is applied via a corresponding conductor 31 to condition one of the AND gates 32. As shown in FIGURE 3, AND gates 32 are connected in series with a positive voltage +V applied as the second input 33 to the first AND gate 32*a* in the series. Therefore, if the unknown character matches the particular reference character with which it is being compared, all the AND gates 32 corresponding to that reference character will be closed to provide a path for the voltage +V to appear on the output conductor 35. However, in the case shown, the specimen is an Arabic numeral "7" and AND gates 32 represent the numeral "0." That is, the adders 20 corresponding to AND gates 32 are associated with the registers 18 containing the individual row and column counts for a reference character "0." Therefore, no circuit is completed through AND gates 32 and there will be no output voltage on line 35. For the same reason, there will not be any path completed through the second level 36 of AND gates or through the third level 38, but since the fourth level 40 AND gates are associated with the registers 18 holding the row and column counts for a numeral 7, a series circuit will be formed through AND gates 40 to produce an output voltage on line 42. This output indicates that the row and column count of the unknown character corresponds to the row and column count of the reference character "7," thereby identifying or recognizing the unknown character as "7."

In some applications, it is desirable to attempt to recognize an unknown character even though it does not perfectly match any of the reference characters. The amount of error or tolerence allowed may be varied by virtue of the additional output lines 24 and 26 from the adders 20. For example, line 24*a* is connected to the adder in such a manner as to provide a positive output when the counts in counter 16*a* and register 18*a* differ by one unit. By closing the switch in line 24*a*, this output may be applied through OR gate 30*a* to AND gate 32*a* to provide an indication of a match just as if there had been a perfect match which would have been indicated by an output on line 22*a*. In like fashion, the tolerance may be raised to a difference of two by closing the switch in the line 26*a* which carries an output pulse from adder 20*a* when the counts in counter 16*a* and register 18*a* differ by two units.

Figures 4, 5, 5B:
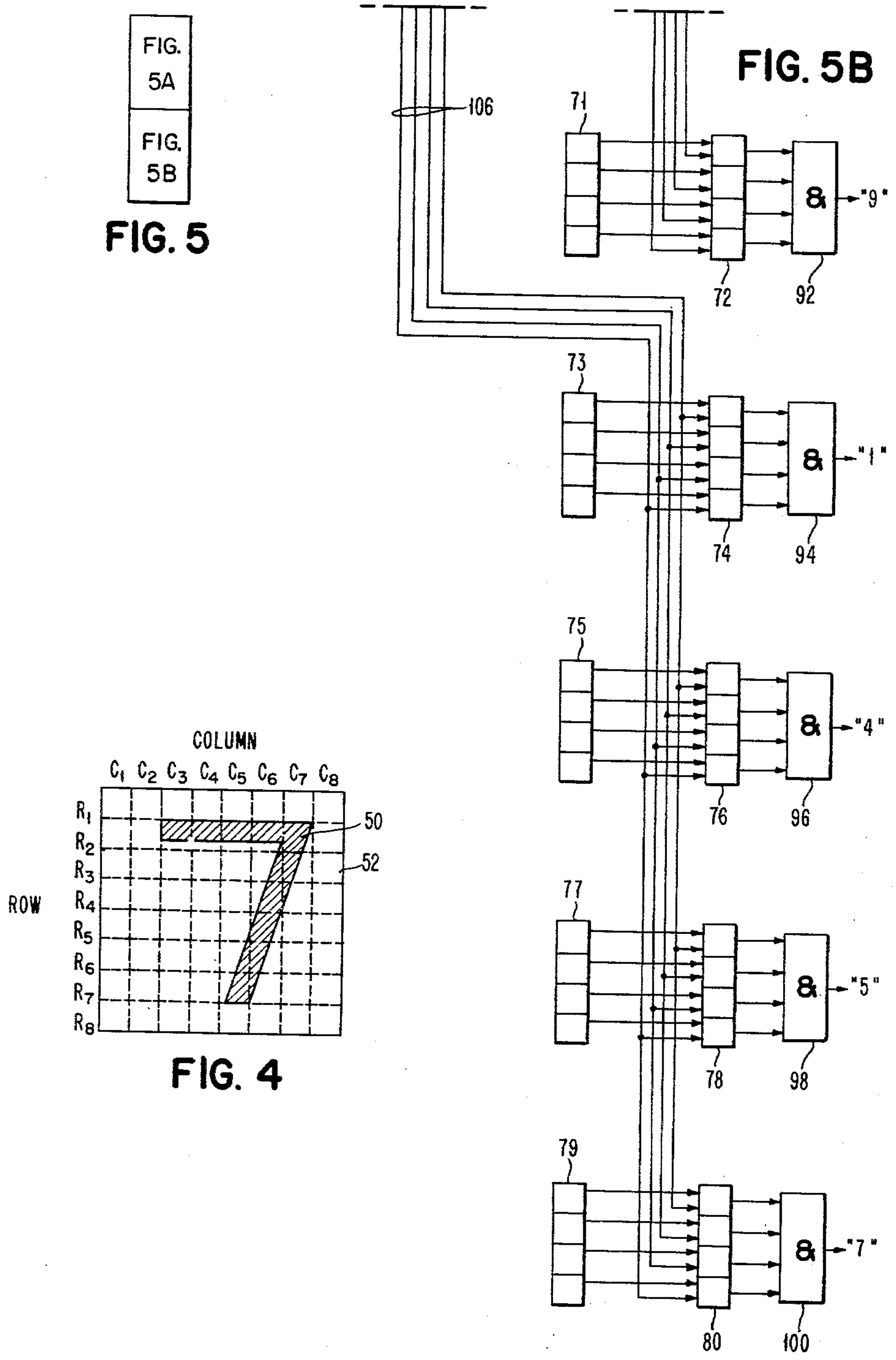
FIGURE 4 shows a typical character displaced on a larger matrix.
FIGURE 5 shows a more sophisticated character recognition system which embodies this invention and provides greater resolution of the unknown character.
Figure 5A:
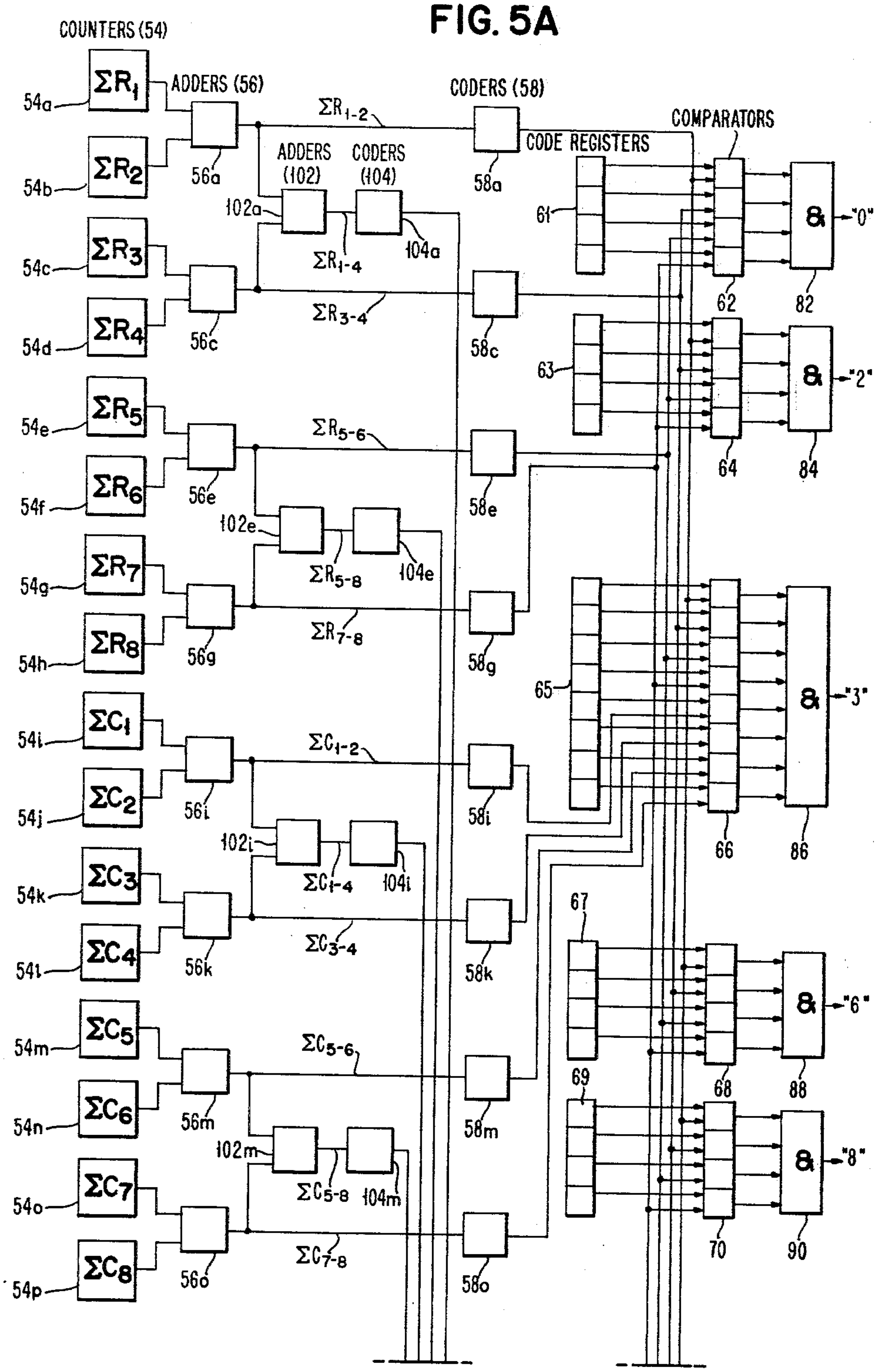
Figure 6:
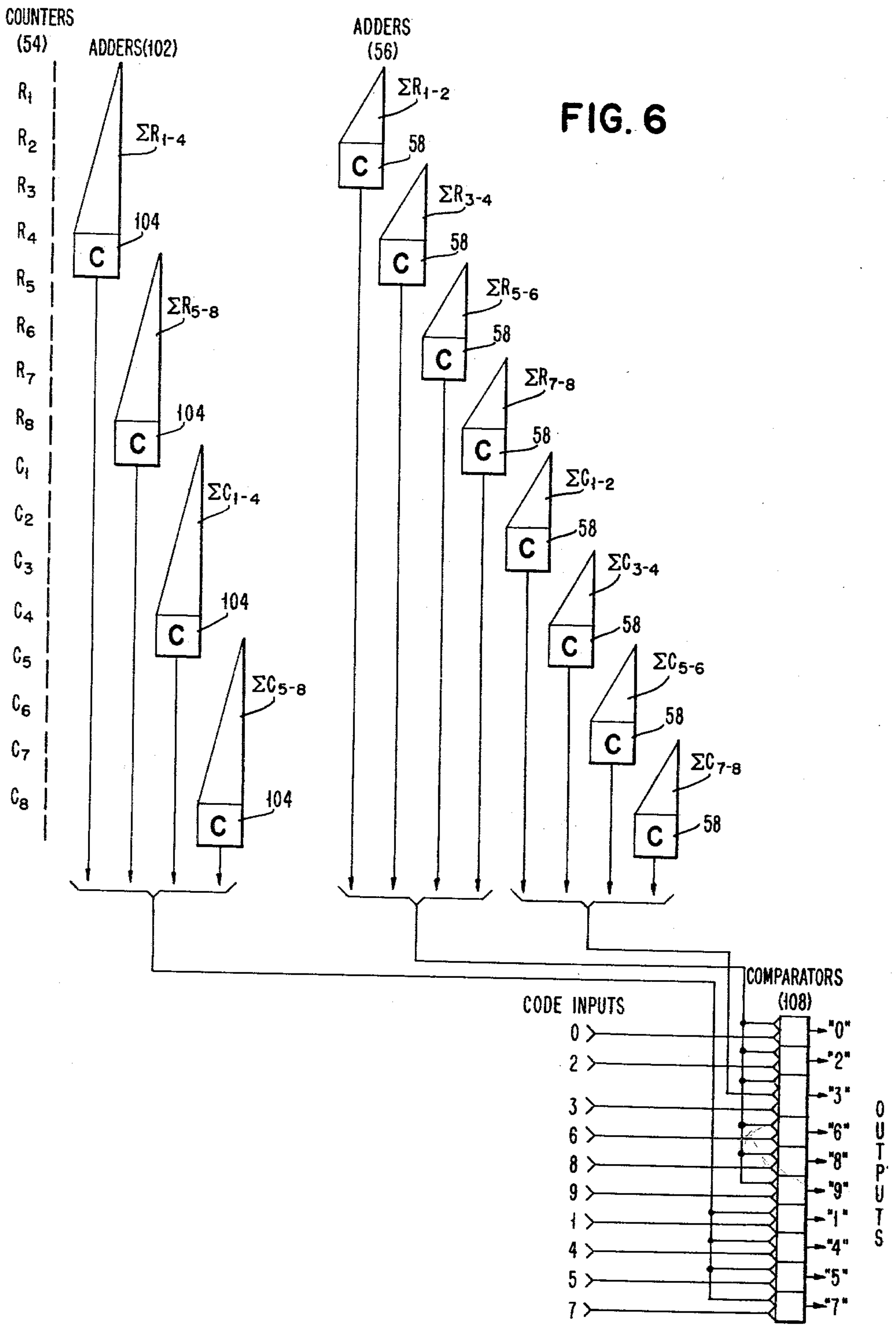
FIGURE 6 is a block diagram illustrating the use of cryogenic adders in the higher resolution apparatus.

FIGURES 4, 5 and 6 illustrate a more sophisticated apparatus embodying the same inventive concept as described in connection with the apparatus shown in FIGURES 1–3.

FIGURE 4 shows an unknown character 50 displayed on an eight-by-eight matrix 52. The individual columns and rows of the matrix are scanned to provide an electrical pulse for each matrix segment containing a portion of the character 50. These pulses are applied to sixteen individual column and row counters 54*a*, *b . . . o, p*, each of which stores the count or sum of occupied matrix segments for its corresponding row or column. Counters 54 correspond to counters 16 in FIGURE 2.

The counts of successive pairs of counters 54 are fed to corresponding adders 56*a*, *c . . . m, o*, whose outputs are each equal to the sum of a pair of rows or columns. These sums may be referred to as secondary sums.

The output of each of the adders 56 is applied to a corresponding one of a plurality of coders 58*a*, *c . . . m, o*, which produce coded outputs based on the bit count inputs considered in groups of two, as follows.

| Bit count input: | Coder output |
|---|---|
| 0–4 | 0 |
| 5–7 | 1 |
| 8 or more | 2 |

These coder analog outputs are then applied via corresponding conductors 60 as one input to each stage of analog comparators 62, 64, 66, 68, 70 and 72. Additional comparators 74, 76, 78 and 80 are also provided and will be described below. The operation of comparator 66 will also be described below.

Stored in each one of a plurality of code registers 61, 63, 65, 67, 69, 71, 73, 75 and 79 is a corresponding recognition code for a reference or perfect character. Except for register 65 corresponding to the reference character "3", all the code registers have four stages with each stage providing the second input to the corresponding stage of one of the comparators 62–80. When the recognition code in one of the code registers matches the unknown character code applied to its associated comparator, all four output lines from the comparator will be up, i.e., each line carries a positive voltage. The outputs of the comparators are fed to corresponding AND gates 82, 84, 86, 88, 90, 92, 94, 96, 98, and 100.

In FIGURE 5, each AND gate corresponds to one of the Arabic numerals 1, 2 . . . 9, 0, as indicated adjacent the output line of each AND gate. When all four input lines for any AND gate are up, the output of the AND gate will be up, thereby indicating that the unknown character matches the reference character whose recognition code is stored in the code register corresponding to that AND gate. As indicated in FIGURE 5, the Arabic numerals "0", "2", "6", "8", "9" may be recognized by utilizing only the outputs of adders 56 and comparing these outputs with the reference characters stored in the code registers.

However, additional combinations of row and column counts are necessary to identify or recognize the remaining Arabic numerals. To accomplish this function, there is connected to the output of each pair of adders 56 one of a plurality of adders 102, each of which sums or accumulates the outputs of its corresponding pair of adders 56 to provide what we shall call a tertiary sum. For example, adder 102*a* sums the outputs of adders 56*a* and 56*c* to provide a tertiary sum equal to the sum of the character segment bit counts of rows 1–4, inclusive, of matrix 52. The output of each of the adders 102 is applied to a corresponding one of a plurality of coders 104 which provide coded outputs based on the bit count inputs considered in groups of four, as follows.

| Bit count input | Coder output |
|---|---|
| 0–4 | 0 |
| 5–9 | 1 |
| 10 or more | 2 |

The outputs of coders 104 are applied via conductors 106 to corresponding stages of each of the comparators 74, 76, 78 and 80. The other input to each of the comparator stages is from a corresponding stage of an associated code register 73, 75, 77 and 79. These comparators then function in the manner identical to those already discussed to provide an output from one of the AND gates 94–100 when the reference character recognition code in a code register matches the output code appearing on conductors 106.

In order to recognize the Arabic numeral "3", an eight-stage comparator 66 and an eight-stage code register 65 are required. For the numeral "3" the outputs of coders 58*i*, 58*k*, 58*m* and 58*o*, as well as the outputs of coders 58*a*, 58*c*, 58*e* and 58*g*, must be compared in comparator 66 with the recognition code appearing in register 65. The corresponding AND gate 86 then has eight inputs all of which must be up in order to provide an output to indicate that the unknown character is the Arabic numeral "3".

It is of course to be understood that the arrangement shown in FIGURE 5 may be expanded to cover a greater number of recognition codes, or to increase the resolution of the ten codes shown, merely by inserting additional adders to provide other combinations of row and column counts which may then be coded by appropriate coders to provide output codes which may be compared with recognition codes. Of course, the recognition codes must have a correspondingly larger number of stages to provide the comparison with the higher resolution codes representing the unknown character.

The stages of comparator 80 have been labeled to indicate the output of coders 104 for an unknown specimen 50 in the form of the Arabic numeral "7", displayed on matrix 5 shown in FIGURE 4. As may be determined from the above chart for the outputs of coders 104, the output codes on conductors 106 will be 1102. Stored in code register 79 will be the identical code so that all four input lines to AND gate 100 will be up to provide an output therefrom, thereby indicating that the specimen or unknown character 50 is the Arabic numeral "7".

The following is a detailed explanation of the operation of the circuit shown in FIGURE 5, utilizing the Arabic numeral "7" as the unknown character 50. The eight-by-eight matrix shown in FIGURE 4 is not to be considered optimum, but is merely to be used as an illustration since any size matrix may be used.

| Counters 54 | Outputs of Adders 56 and 102 | Coders 58 and 104 |
|---|---|---|
| $\Sigma R_1=0$ | $\Sigma R$1–4=9 | #104*a*=1 |
| $\Sigma R_2=5$ | $\Sigma R$ 5–8=6 | #104*e*=1 |
| $\Sigma R_3=2$ | $\Sigma C$ 1–4=2 | #104*i*=0 |
| $\Sigma R_4=2$ | $\Sigma C$ 5–8=13 | #104*m*=2 |
| $\Sigma R_5=2$ | $\Sigma R$ 1–2=5 | #58*a*=1 |
| $\Sigma R_6=2$ | $\Sigma R$ 3–4=4 | #58*c*=0 |
| $\Sigma R_7=2$ | $\Sigma R$ 5–6=4 | #58*e*=0 |
| $\Sigma R_8=0$ | $\Sigma R$ 7–8=2 | #58*g*=0 |
| $\Sigma C_1=0$ | $\Sigma C$ 1–2=0 | #58*i*=0 |
| $\Sigma C_2=0$ | $\Sigma C$ 3–4=2 | #58*k*=0 |
| $\Sigma C_3=1$ | $\Sigma C$ 5–6=10 | #58*m*=2 |
| $\Sigma C_4=1$ | $\Sigma C$ 7–8=3 | #58*o*=0 |
| $\Sigma C_5=4$ | | |
| $\Sigma C_6=6$ | | |
| $\Sigma C_7=3$ | | |
| $\Sigma C_8=0$ | | |

These circuits exhibit a hierarchy of decision making. Note that the numbers 1, 4, 5 and 7 can be recognized by a relatively coarse or low resolution count of black bits or character segments. That is, it is necessary to count only in groups of four rows (rows 1–4, 5–8, columns 1–4, 5–8) to recognize these numbers, but it is necessary to break down further the bit count into groups of two (rows 1–2, 3–4, etc.; columns 1–2, 3–4, etc.) in order to recognize the remaining numbers. When a larger matrix is used, even greater resolution may be obtained by generating more group sums.

Shown in FIGURE 6 is a cryogenic embodiment of the character recognition apparatus illustrated in FIGURE 5. Each of the counters 54 is represented merely by its corresponding row or column of matrix 52. The adders 56 and 102 are structurally identical to the counting networks 56 and 58 shown in FIGURE 1 of the co-pending application Serial No. 79,823, filed December 30, 1960 by Harold Fleisher and Robert I. Roth and assigned to the same assignee as the instant application. The coders 58 and 104 are structurally identical to the decode networks 62 also shown in FIGURE 1 of this same co-pending application. The comparator and AND gate functions described with respect to FIGURE 5 may be performed by means of suitable comparators 108.

While there have been shown and described and pointed out the fundamental novel features of the invention as applied to a preferred embodiment, it will be understood that various omissions, substitutions and changes in the form and detail of the device illustrated and in its operation may be made by those skilled in the art without departing from the spirit of the invention. It is the intention therefore to be limited only as indicated by the scope of the following claims.

What is claimed is:

1. Character recognition apparatus for identifying a specimen character displayed on a matrix having *m* rows and *n* columns, a counter associated with each row for counting the number of character bits therein, a counter associated with each column for counting the number of character bits therein, a plurality of registers containing individual row and column counts of a reference character, and comparison means responsive to the column and row counters for producing individual outputs when the counts of corresponding rows and columns are equal, a group of AND gates corresponding to the reference character, each of said AND gates being responsive to a different one of said individual outputs, and means connected to said group of AND gates to provide a recognition signal when the bit counts of all the corresponding rows and columns of the specimen and reference characters are equal.

2. Character recognition apparatus as defined in claim 1 further comprising means associated with said comparison means to provide said individual outputs when the column and row bit count of said unknown and reference characters differ by a predetermined amount.

3. Character recognition apparatus for identifying a specimen character displayed on a matrix having *m* rows and *n* columns, a counter associated with each row for counting the number of character bits therein, a counter associated with each column for counting the number of character bits therein, first adder means responsive to selected row and column counters to provide first sum signals representing the first sums of said selected row and column counts, second adder means responsive to selected first sum signals to produce second sum signals representing second sums of selected first sums, individual register means containing various predetermined combinations of corresponding first sums and second sums of reference characters and comparison means responsive to said first and second adder means and to said individual register means to produce a character recognition signal corresponding to the individual register means whose combination of sums matches the selected first and second sums of said specimen character.

References Cited in the file of this patent

UNITED STATES PATENTS

| | | |
|---|---|---|
| 2,838,602 | Sprick | June 10, 1958 |
| 2,919,426 | Rohland | Dec. 29, 1959 |
| 2,968,789 | Weiss | Jan. 17, 1961 |
| 2,978,675 | Highleyman | Apr. 4, 1961 |